United States Patent [19]
Morimoto et al.

[11] Patent Number: 5,972,507
[45] Date of Patent: Oct. 26, 1999

[54] METHOD OF MANUFACTURING CELLULOSE BEADS

[75] Inventors: Yasuo Morimoto; Noriaki Tsukida; Hiroshi Saga; Hidenao Saito, all of Fukui, Japan

[73] Assignee: Rengo Co., Ltd., Osaka, Japan

[21] Appl. No.: 08/998,037

[22] Filed: Dec. 23, 1997

[30] Foreign Application Priority Data

Dec. 26, 1996 [JP] Japan .................................. 8-356865

[51] Int. Cl.$^6$ .................................................. C08B 15/00
[52] U.S. Cl. ................................ 428/402; 264/8; 425/8; 425/10; 536/56; 536/57
[58] Field of Search ................................ 264/8; 428/402; 536/57, 56; 425/8, 10

[56] References Cited

U.S. PATENT DOCUMENTS

| | | | |
|---|---|---|---|
| 1,782,038 | 11/1930 | Haak | 264/8 |
| 2,299,929 | 10/1942 | Raynolds, Jr. | 264/8 |
| 2,439,772 | 4/1948 | Gow | 264/8 |
| 2,495,147 | 1/1950 | Street | 264/8 |
| 3,272,893 | 9/1966 | Mogensen | 264/8 |
| 4,063,017 | 12/1977 | Tsao et al. | 536/57 |
| 4,090,022 | 5/1978 | Tsao et al. | 536/57 |
| 5,026,841 | 6/1991 | Francotte et al. | 536/58 |
| 5,047,180 | 9/1991 | Steiner et al. | 264/5 |
| 5,245,024 | 9/1993 | Scarpa et al. | 536/56 |
| 5,328,603 | 7/1994 | Velander et al. | 536/57 |
| 5,527,902 | 6/1996 | Loth et al. | 536/57 |

FOREIGN PATENT DOCUMENTS 2254822  10/1992  United Kingdom.

OTHER PUBLICATIONS

Chemical Abstracts, vol. 80, No. 10, 1974, Columbus, Ohio, US; abstract No. 49507m, p. 87; col. 1; XP002085183 & JP 73 043082 A (Asahi Chemical Industry Co., Ltd) Jun. 22, 1973.

Patent Abstracts of Japan, vol. 012, No. 326 (C–525), Sep. 5, 1988 & JP 63 090501 A (Kanebo Ltd; Others: 01), Apr. 21, 1988.

*Primary Examiner*—Mary Lynn Theisen
*Attorney, Agent, or Firm*—Wenderoth, Lind & Ponack, L.L.P.

[57] ABSTRACT

A method for producing cellulose beads which are high in sphericity and narrow in bead size distribution. Cellulose beads are produced by supplying a cellulose solution into a rotating vessel which is rotated at high speed by a rotary shaft and has outlets such as small holes and nozzles, flying droplets formed under a centrifugal acceleration of 10 to 1000 G through the outlets that have a diameter of 0.1 to 5.0 mm, and capturing the droplets with a coagulating solution to coagulate the droplets.

12 Claims, 8 Drawing Sheets

METHOD OF MANUFACTURING CELLULOSE BEADS

BACKGROUND OF THE INVENTION

This invention relates to a method of manufacturing cellulose beads and cellulose beads produced thereby.

Cellulose beads and cellulose derivative beads (hereinafter comprehensively referred to as cellulose beads) are used as ion exchangers, packing materials for chromatography, adsorbents for heavy metal ions and proteins, cosmetic additives, carriers for immobilization of biocatalyst, etc.

Commonly for these applications, such cellulose beads have to have high mechanical strength in conformity with their intended use, have to be as near to spheres as possible, and have to be as uniform in bead size as possible, i.e. as narrow in bead size distribution as possible.

Cellulose beads have to be as near to spheres as possible because the lower their sphericity, the larger the contact area between beads, and thus the smaller the exposed effective surface area of the beads. A large contact area between beads also leads to increased wear between beads and thus decrease in their mechanical strength. On the other hand, if beads that are rather wide in bead size distribution are put in a column or a tank as ion exchangers or packing material for chromatography, smaller beads may close gaps between larger beads, thus reducing the flow rate and increasing the pressure loss and thus the possibility of breakage of beads.

Also, it is a recent trend for customers to specify the bead size distribution as well as the average bead size. To meet this requirement, beads have to be separated e.g. on sieves. Such a separation step aggravates yield and manufacturing efficiency.

Conventional methods for manufacturing cellulose beads are roughly classified into two groups. Methods in the first group are chemical methods in which a cellulose solution is stirred in a dispersion medium to disperse small droplets of the cellulose solution utilizing phase separation between a cellulose solution and a dispersion medium, and coagulating the droplets to form cellulose beads. Methods in the second group are physical or mechanical methods in which a cellulose solution is sprayed with high pressure gas through nozzles and droplets thus formed are coagulated or dried to obtain cellulose beads.

Methods in the first group are disclosed in the following three patent publications. Firstly examined Japanese patent publication 57-45254 discloses a method of manufacturing spherical cellulose beads. This method comprises the steps of continuously stirring a suspension of viscose in a water immiscible solvent having a viscosity of 100 centistokes (cst) or less such as chlorobenzene while heating it to 30–100° C. until the suspension solidifies into beads, and subjecting the beads to acid-hydrolysis to produce spherical cellulose beads.

In the method disclosed in examined Japanese patent publication 55-39565, a methylene chloride or chloroform solution of cellulose triacetate is added dropwise while stirring into an aqueous medium obtained by dissolving in water a stabilizer such as a gelatine or a polyvinyl alcohol, and the mixture is heated to obtain spherical beads of cellulose triacetate, and the beads obtained are saponified to produce intended cellulose beads.

Examined Japanese patent publication 6-62781 discloses a method of producing porous cellulose beads comprising the steps of blending an alkaline aqueous polymer solution of cellulose xanthate and a water soluble polymer other than cellulose xanthate with an anionic polymer to produce a suspension of an alkaline aqueous polymer solution, and coagulating the suspension by heating or adding a cellulose xanthate coagulant, and then neutralizing it with an acid to regenerate cellulose beads while simultaneously removing the water soluble polymer from the cellulose beads, or coagulating and neutralizing the suspension with an acid to regenerate cellulose beads while simultaneously removing the water soluble polymer from the cellulose beads.

A method in the second group is disclosed in examined Japanese patent publication 56-21761. In this method, a viscose or cellulose cuprammonium solution is continuously extruded through a discharge nozzle into the atmosphere so that the solution is spontaneously split, and the split droplets of the cellulose solution are fed into a coagulating/regenerating bath.

Another method in the second category is disclosed in unexamined Japanese patent publication 4-41533. In this method, a solution of sodium cellulose xanthate is sprayed into hot blast with an atomizer such as a twinfluid atomizer or a rotary nozzle and dried to produce cellulose beads.

The methods in the first category require precise preparation of the cellulose solution, and strict control of the stirring speed. These methods are thus difficult to carry out. Also, since these methods are all batch type, production efficiency is low.

The methods in the second category need no complicated equipment. Beads can be produced continuously. But these methods have other problems. One problem is that a liquid sprayed in mist into an air stream forms numerous beads that are irregular in shape and size, thus widening the bead size distribution. Also, since the cellulose solution is sprayed under high pressure in the form of minute droplets, the droplets tend to be scattered at high speed until they come into contact with a coagulating solution. This increases the possibility of secondary fragmentation of beads, so that air bubbles tend to mix into the beads to form relatively large pores therein. This lowers the mechanical strength of the beads.

An object of this invention is to provide a method of producing cellulose beads and porous cellulose beads which are free of these problems of the conventional methods, and which can produce cellulose beads that are high in sphericity and narrow in bead size distribution, and to provide such cellulose beads by the method.

SUMMARY OF THE INVENTION

According to this invention, there is provided a method of manufacturing cellulose beads comprising the steps of supplying a cellulose solution into a rotating vessel rotated at high speed, flying the small droplets of the cellulose solution through outlets formed in the rotating vessel and having a diameter of 0.1 to 5.0 mm under a centrifugal acceleration of 10 to 1000 G to form droplets, and capturing the droplets with a coagulating solution to coagulate the droplets.

Preferably, the cellulose solution contains 2–30 wt % of cellulose.

Also, the cellulose solution is preferably an alkaline cellulose solution in which is dissolved at least one polysaccharide, and the coagulating solution is an acidic solution.

This invention also provides cellulose beads produced by the abovementioned method and having a bead size distribution of 4 or over as expressed by the exponent in the Rosin-Rammler distribution functional equation.

In the method according to this invention, by the effect of surface tension, small droplets flown through the outlets formed in the rotating vessel under centrifugal force turn to spherical shape by the time they are caught in the coagulating solution without secondary fragmentation or mixing of air bubbles thereinto. The cellulose beads thus formed are extremely high in sphericity and narrow in bead size distribution.

In the method using an alkaline cellulose solution and an acidic coagulating solution to produce porous cellulose beads, when cellulose in the cellulose solution separates from the liquid phase and coagulates, the polysaccharide or polysaccharides dissolved in the cellulose solution cause phase separation in which they condense to form microdomains. Simultaneously the polysaccharides are hydrolyzed and depolymerized by the acidic coagulating solution, and removed from the coagulated cellulose beads. The beads thus formed have independent pores that are uniform in size and dispersed uniformly in the beads.

Other features and objects of the present invention will become apparent from the following description made with reference to the accompanying drawings, in which:

DETAILED DESCRIPTION OF THE PREFERRED EMBODIMENT

Embodiments of this invention are now described with reference to the attached drawings.

Figure 1:
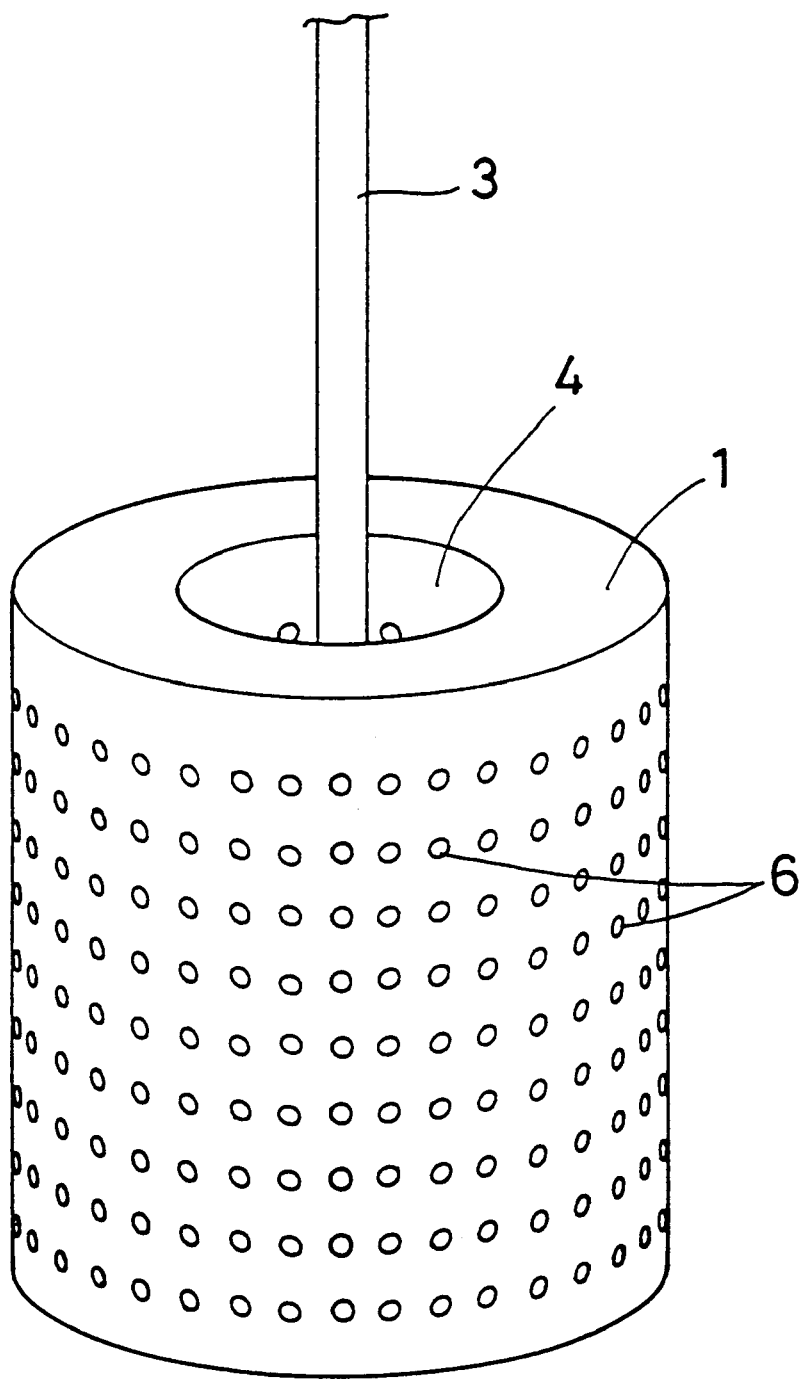
FIG. 1 is a perspective view of a rotating vessel used in Example 1.
Figure 2:
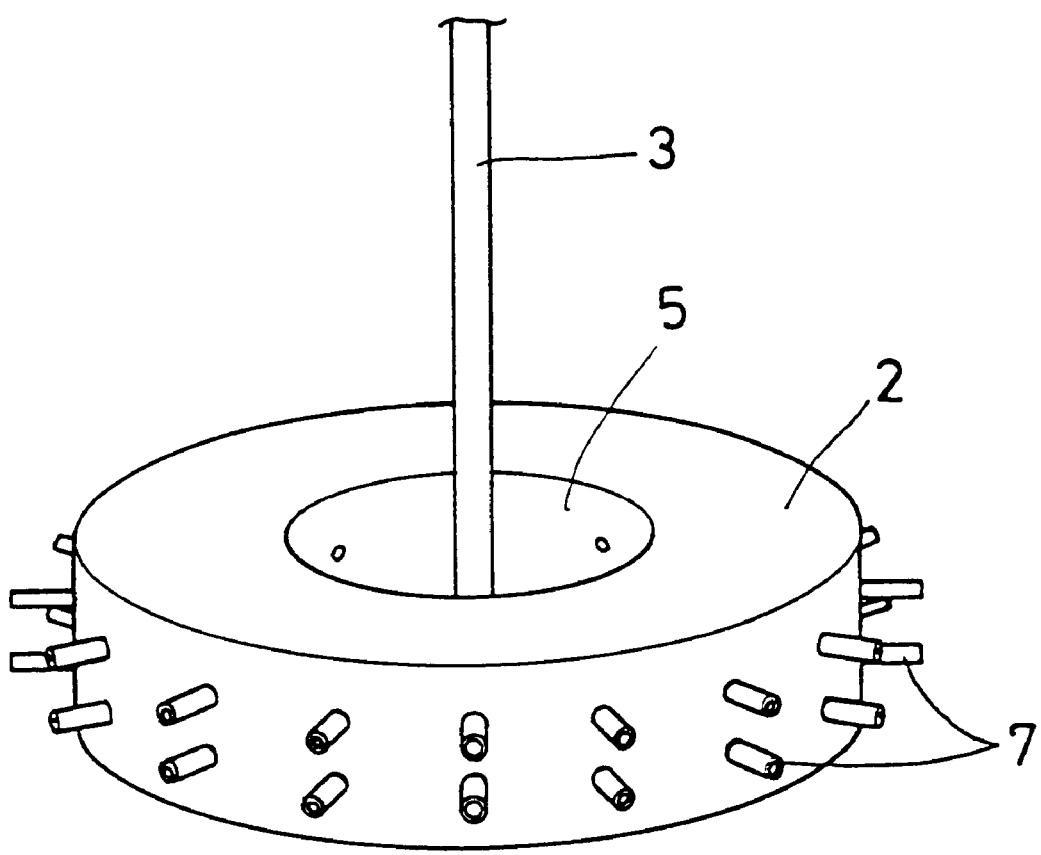
FIG. 2 is a perspective view of a rotating vessel used in Example 2.

As shown in FIGS. 1 and 2, a cylindrical rotating vessel 1, 2 of each embodiment is mounted on a rotary shaft 3 rotated by an unillustrated driving means, and has a top opening 4, 5, and outlets in the form of small holes 6 or nozzles 7 extending through its peripheral wall. The rotating vessel of this invention is not limited to the illustrated cylindrical one but may be disk-shaped, spherical or otherwise shaped provided it is a hollow vessel having a rotary shaft and a peripheral wall with a circular surface.

The outlets are not limited to the small holes 6 or nozzles 7 shown in FIGS. 1 and 2, but may be of any type provided a cellulose solution can be discharged therethrough.

If a cellulose solution is supplied onto the top surface of a rotary disk with no outlets to scatter under centrifugal force, the solution is discharged in the form of threads, so that the minutely broken droplets, called "satellites", tend to form, thus widening the bead size distribution.

The outlets of the rotating vessel according to this invention have a diameter of 0.1–5 mm. If the outlet diameter is below this range, not only will the yield deteriorate, but the cellulose solution will gelatinize in the nozzles, increasing the possibility of clogging the nozzles. If the outlet diameter is above the predetermined range, the solution tends to drool from the outlets, making it difficult to produce spherical beads with a uniform bead size.

The centrifugal acceleration applied to the outlets is preferably 10–1000 G. If the centrifugal acceleration is below this range, droplets will become difficult to be formed or flown. If it is above this range, the cellulose solution will be discharged in the form of threads (or continuous droplets). This widens the bead size distribution, making it impossible to produce beads as desired. Intended beads can be produced by controlling the bead size by properly setting these conditions.

Cellulose solutions used in this invention include alkaline cellulose solutions such as viscose (i.e. aqueous or sodium hydroxide solutions of sodium cellulose xanthate), and cellulose cuprammonium solution, and other solutions in which cellulose is dissolved in various solvents such as organic solvents.

Preferably, such cellulose solutions have a cellulose concentration of 2–30 wt %. If the cellulose concentration is below this range, the mechanical strength of the beads will be practically low and it will be difficult to produce beads that are sufficiently high in sphericity. If the concentration is above this range, the viscosity of the solution will be so high as to cause clogging of the outlets, thus making it difficult to form droplets under centrifugal force.

The kind of coagulating solution used in this invention is determined according to the cellulose solution used. For example, if an alkaline cellulose solution such as viscose is used as the cellulose solution, the coagulating solution may be an inorganic acid such as sulfuric acid or hydrochloric acid, an organic acid such as an acetic acid, a salt solution such as calcium salt, or an organic solvent such as ethanol.

Polysaccharides used for the production of porous cellulose beads should be alkali-soluble and be easily hydrolyzable by acids. Such polysaccharides include starch and its derivatives, pullulan, dextran and gum arabic. Starch and its derivatives are especially preferable because they are cheap. They may be of potato, corn or tapioca origin, or may be chemically, physically or biologically modified starch. Such modified starch include such as dextrin, acid-treated starch, oxidized starch and dialdehyde starch, starch ethers such as carboxymethylated starch and hydroxyethylated starch, starch esters such as monostarch phosphate and acetylated starch, physically modified starch such as α-starch and heat-moisture treated starch, and enzyme-treated starch such as amylose.

In this droplet forming arrangement, small droplets formed are flown in the air under centrifugal force. By the effect of surface tension of droplets, the flying droplets turn to spherical shape with a required bead size by the time they come into contact with the coagulating solution without the possibility of secondary fragmentation or mixing of air bubbles.

Figure 3:
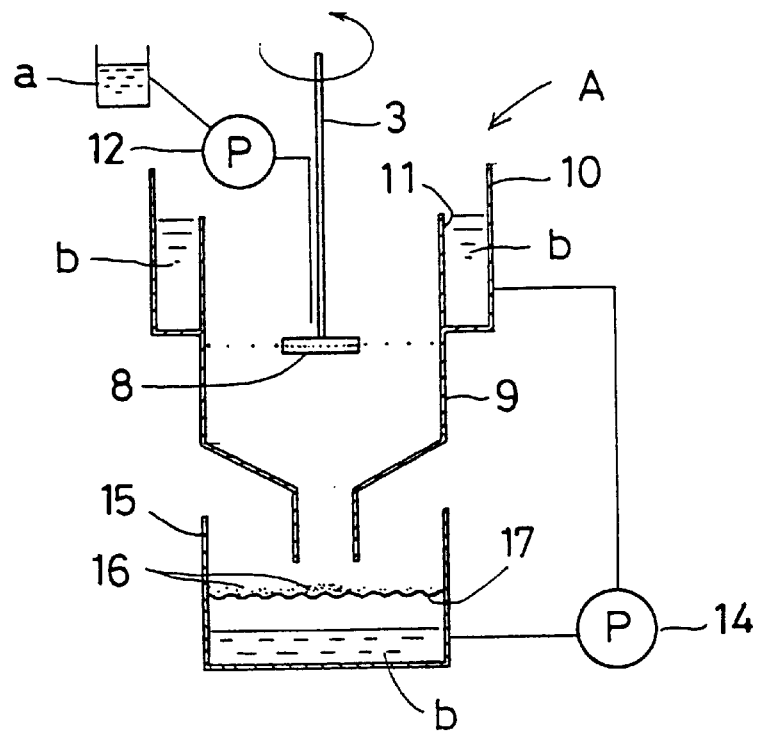
FIG. 3 is a schematic view showing an embodiment of a device for producing cellulose beads.

A device for capturing droplets in the coagulating solution (hereinafter simply referred to as "coagulating device") may be a container provided under the rotating vessel and having a large top opening (that is, large coagulating tank). But such a device as shown in FIG. 3 is preferable because it is compact and simple in structure. This device may comprise a tubular wall 9 surrounding the rotating vessel 8, and an annular liquid tank 10 provided around the wall 9 near its top for storing coagulating solution b. The tank 10 has a top opening with its outer wall at a higher level than its inner wall to define an outlet 11 through which the coagulating solution b supplied by a pump 14 overflows and falls toward the inner surface of the wall 9.

Figure 4:
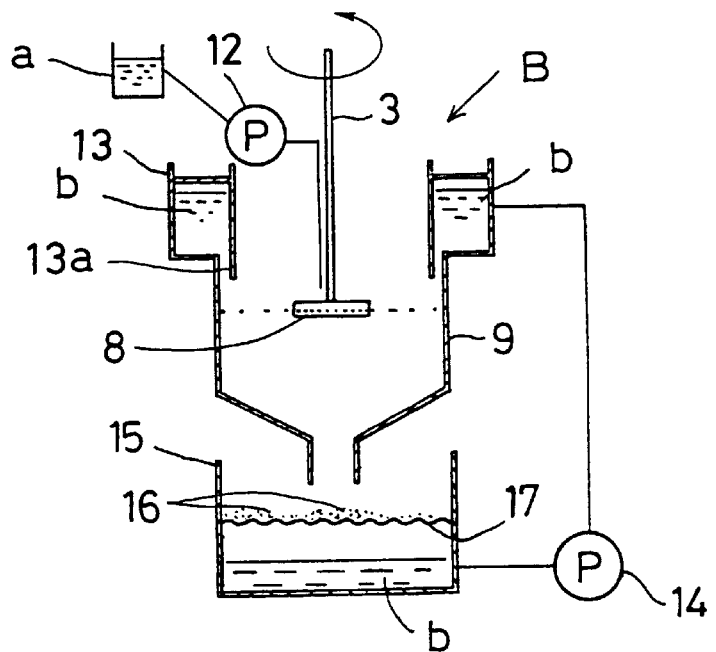
FIG. 4 is a similar view of another embodiment.

The coagulating device shown in FIG. 4 has, instead of the open-topped liquid tank 10 of FIG. 3, a close-topped annular liquid tank 13 having at its bottom an annular slit-like opening 13a through which coagulating solution b is discharged so as to fall along the inner surface of the tubular wall 9. Otherwise, this device is of exactly the same structure as the device of FIG. 3.

With such a compact and structurally simple coagulating device, coagulating solution flows slowly and smoothly along the inner surface of the tubular wall 9, which surrounds the rotating vessel 8. The slowly and smoothly falling coagulating solution catches and coagulates droplets without deforming them.

EXAMPLE 1

Cellulose beads were produced using the device A shown in FIG. 3. The device A is the combination of the coagulating device shown in FIG. 3 and the rotating vessel 1 shown in FIG. 1. The cylindrical, stainless steel rotating vessel 1 (100 mm diameter and 200 mm high) mounted on the rotary shaft 3 has at its top an opening 4 having a diameter of 50 mm, and in its side wall 1620 small (0.3 mm diameter) holes 6 arranged at equal intervals.

As shown in FIG. 3, cellulose solution a is supplied into the rotating vessel 1 (FIG. 1) by the pump 12 with the rotating vessel 1 rotated to fly droplets under the centrifugal acceleration of 71.6 G, while overflowing the coagulating solution b supplied by the pump 14 to let the solution b fall along the inner surface of the tubular wall 9. The tubular wall 9 has a funnel form bottom end under which is provided a collection tank 15 having a filter member or net 17 for collecting cellulose beads 16 by separating them from the coagulating solution b.

The device A separates and collects cellulose beads 16 on the filter member 17. This device is thus capable of efficiently and continuously producing cellulose beads that are high in sphericity and narrow in bead size distribution by coagulating spherical droplets formed under centrifugal force without deforming them.

During the bead production phase, a viscose (cellulose concentration: 8.5 wt %, alkali concentration: 5.3 wt %) was supplied into the rotating vessel 1 while rotating the vessel at 800 rpm. 2N hydrochloric acid stored in the collection tank 15 was supplied into the tank 10 at a rate of 270 liters per minute and circulated therein to let it overflow through the outlet 11 of the 1000 mm-diameter tubular wall 9 at the abovesaid flow rate so that the flying droplets were caught by the falling hydrochloric acid and coagulated. The thus coagulated cellulose beads were separated on the netform filter member 17, which were made of polyvinylidene chloride.

The cellulose beads collected were desulfurized, bleached, water-washed and their bead size distribution was measured by a laser scattering particle size distribution analyzer. The measurement revealed that the cellulose beads had an average bead size of 793 $\mu$m, and a bead size distribution, which is expressed by n in the Rosin-Rammler distribution functional equation $R_{(DP)}=100 \cdot \exp(-bD_p^n)$, of 4.76 (rounded to three decimal places). In this equation, $R_{(DP)}$ is the commulative percentage by weight of residue on sieve, $D_p$ is the bead diameter, and b and n are constants. The value n represents the slope of the line formed by plotting log $\{\log(100/R_{(DP)})\}$ with respect to log $D_p$. When the cellulose beads obtained were sieved by 710 $\mu$m and 850 $\mu$m screens, all the beads were trapped between the two sieves.

Figure 5:
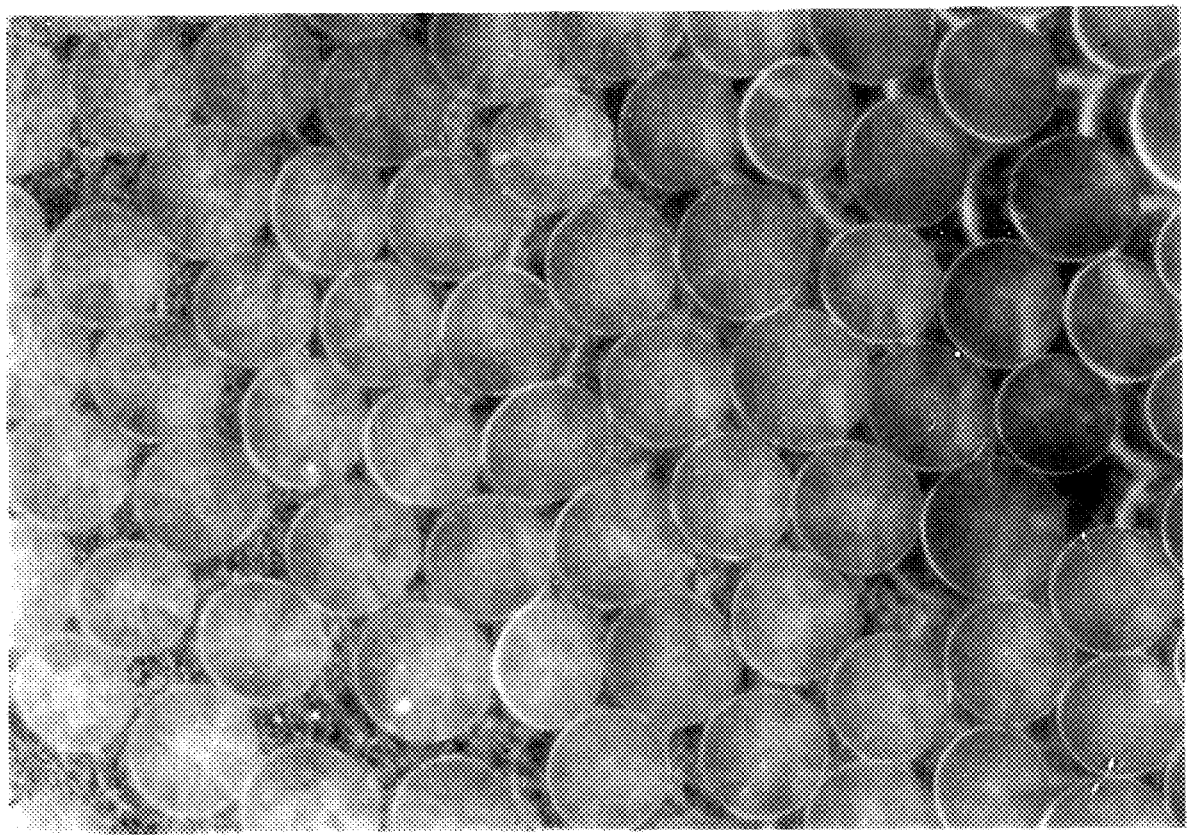
FIG. 5 is an optical micrograph of beads in Example 1.

As observed under an optical microscope, all the beads were spherical and no pores were observed in the beads, as shown in FIG. 5.

EXAMPLE 2

Cellulose beads were produced in exactly the same way as Example 1 except that the rotating vessel 2 shown in FIG. 2 was used instead of the rotating vessel 1 of the device A. The rotating vessel shown in FIG. 2 is a cylindrical, acrylic resin-made rotating vessel 2 (100 mm diameter and 40 mm high) mounted on the rotary shaft 3 and having a 50 mm-diameter top opening 5 through which liquid is supplied, and formed, in its side wall, with 32 nozzles 7 having a diameter of 0.37 mm and arranged at equal intervals.

The same viscose used in Example 1 was supplied into the rotating vessel 2 while rotating the vessel at 1000 rpm to discharge viscose droplets from the nozzles 7 under the centrifugal acceleration of 111.8 G. The subsequent bead production steps were exactly the same as in Example 1.

Figure 6:
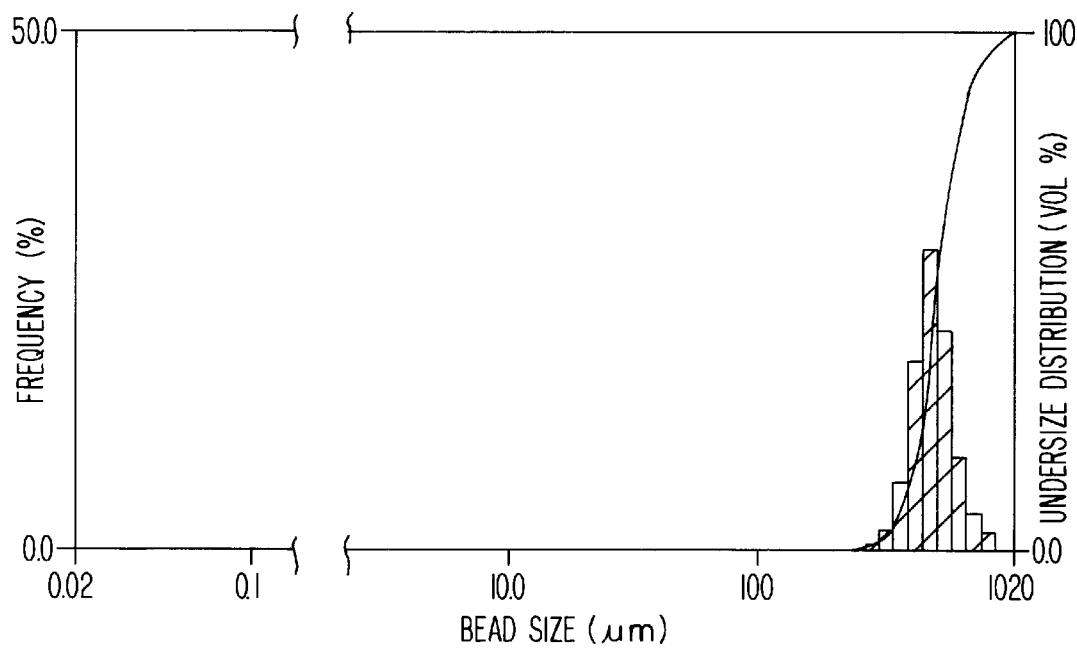
FIG. 6 is a graph showing the volumetric bead size distribution of the beads of Example 2.

The bead size distribution of the cellulose beads obtained was measured by a laser scattering particle size distribution analyzer. The measurement revealed that the cellulose beads had an average bead size of 486 $\mu$m, and a bead size distribution, which is expressed by n in the Rosin-Rammler distribution functional equation, of 4.88 (rounded to three decimal places). FIG. 6 shows a volumetric bead size distribution graph.

EXAMPLE 3

To produce cellulose beads, droplets of cellulose solution were discharged through the nozzles 7 under centrifugal acceleration of 111.8 G in exactly the same way as in Example 2 except that instead of viscose, an LiCl—N,N-dimethylacetamide solution (cellulose concentration: 6 wt %, LiCl concentration: 12 wt %, viscosity at 20° C. as measured by a type B viscometer: 5500 cps), and that instead of 2N hydrochloric acid, ion-exchanged water was used as the coagulating solution.

The cellulose beads obtained had an average bead diameter of 477 $\mu$m and a bead size distribution n of 4.48 (rounded to three decimal places), where n is a constant in the Rosin-Rammler distribution functional equation.

EXAMPLE 4

To produce porous cellulose beads, viscose droplets were discharged through the nozzles 7 under centrifugal acceleration of 111.8 G in exactly the same way as in Example 2 except that the cellulose solution was a mixed one in which a soluble starch (Nacalai tesque, guaranteed reagent) was dissolved in viscose so that the cellulose concentration was 6 wt % and the starch concentration was 6 wt %. Simultaneously, cellulose was regenerated using hydrochloric acid, and the soluble starch was hydrolyzed and removed by eluation. Porous cellulose beads were thus obtained.

The porous cellulose beads obtained had an average bead diameter of 505 $\mu$m and a bead size distribution n of 6.02 (rounded to three decimal places), where n is a value in the Rosin-Rammler distribution functional equation.

Figure 7:
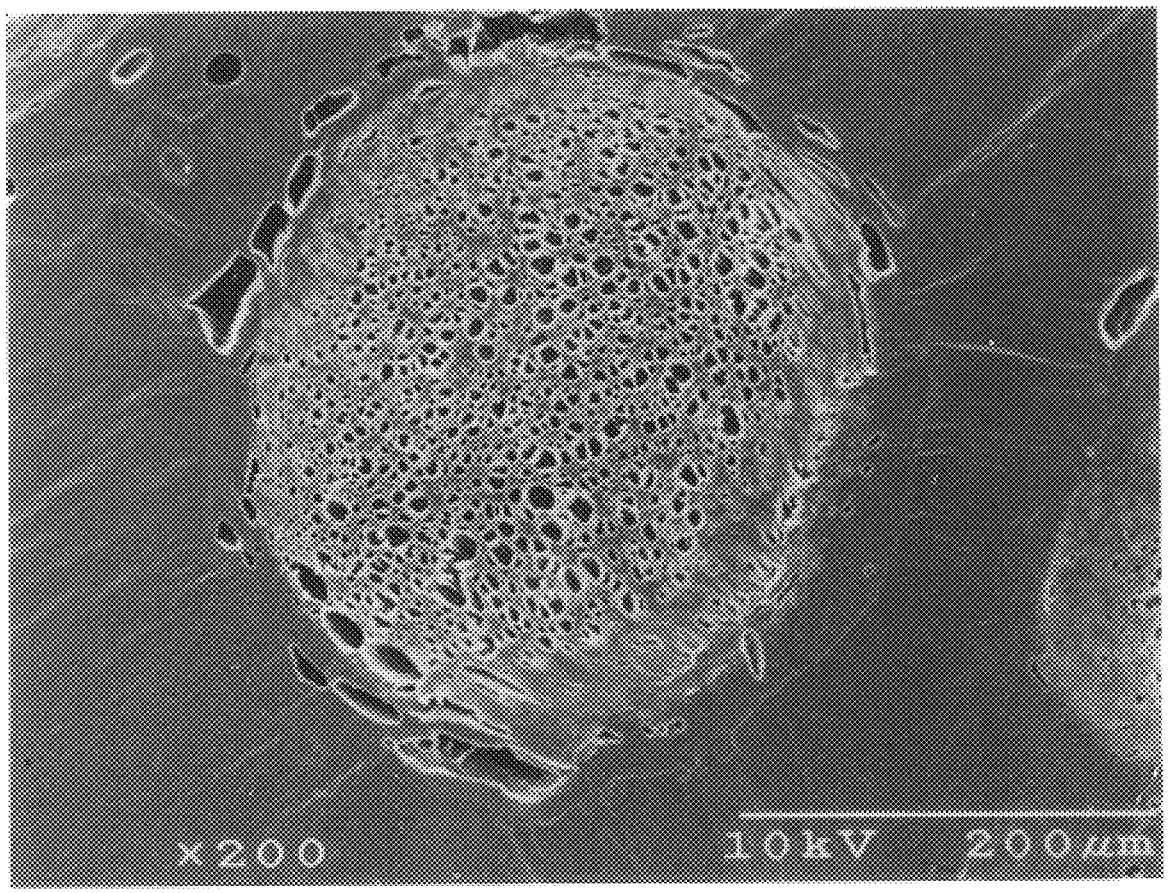
FIG. 7 is a scanning electron micrograph of the beads of Example 4.

The beads obtained were dehydrated with ethanol series, solvent-replaced with t-butanol, and freeze-dried. FIG. 7 is a photomicrograph of a section of such a bead. The porous cellulose bead shown has pores of a uniform size distributed evenly over the entire bead.

CONTROL 1

The same viscose used in Example 1 was sucked and pressurized with a high-pressure power pump and sprayed in a mist through a discharge port 0.5 mm diameter under a pressure of 50 kgf/cm$^2$ on a coagulating/regenerating bath of 2N hydrochloric acid provided 110 cm below the discharge port.

Figure 8:
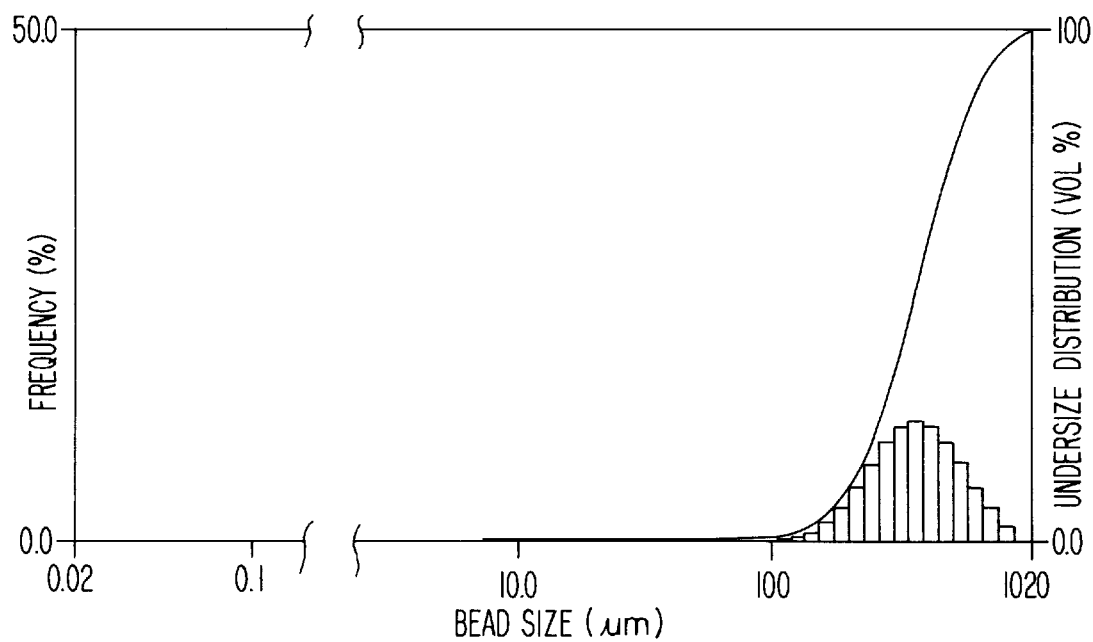
FIG. 8 is a graph showing the volumetric bead size distribution of the beads of Control 1.

The cellulose beads obtained had an average bead diameter of 479 μm, and a bead size distribution n of 2.96 (rounded to three decimal places), where n is a constant in the Rosin-Rammler distribution functional equation. FIG. 8 is a volumetric bead size distribution graph.

Figure 9:
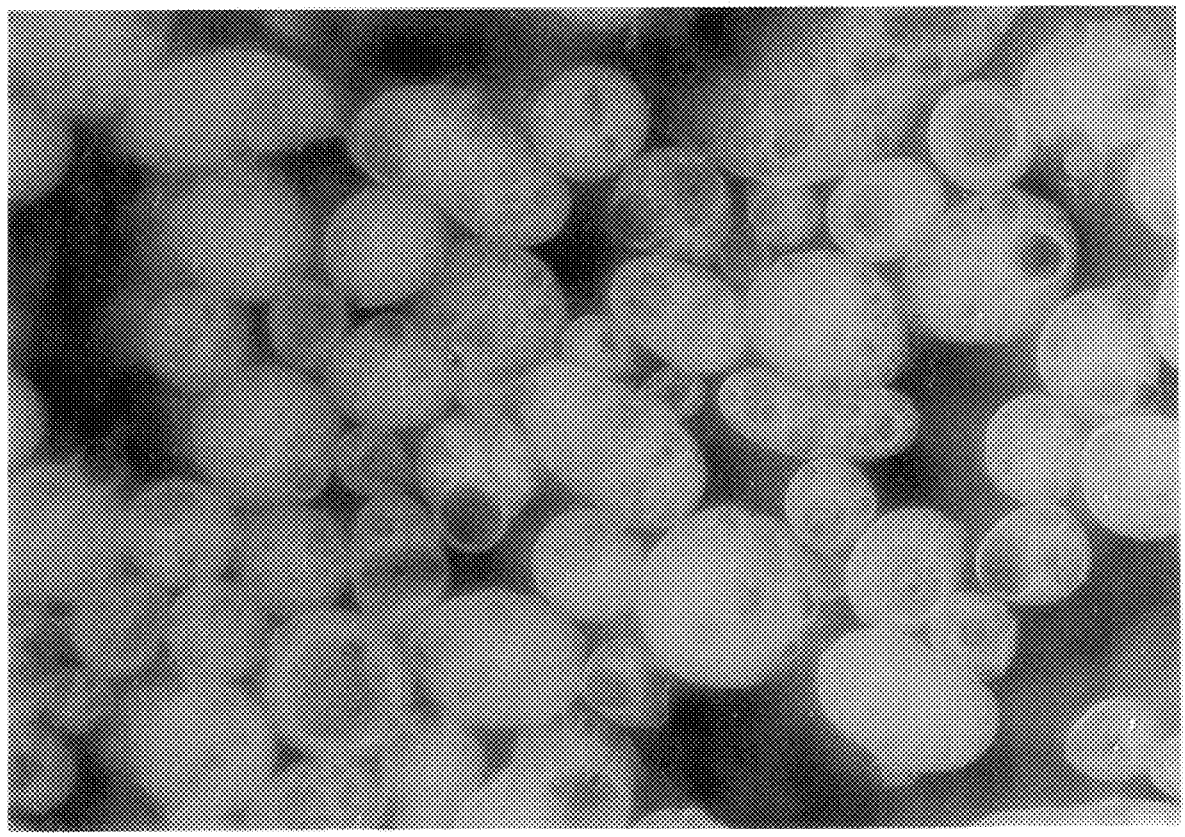
FIG. 9 is an optical micrograph of the beads of Control 1.

As shown in FIG. 9, as observed under an optical microscope, the beads were irregular in shape and bead size and had large pores therein.

CONTROL 2

Cellulose beads were produced using a device as shown in FIG. 3 and having a rotary disk (100 mm in diameter) mounted on the rotary shaft and designed so that liquid was supplied on its top.

Cellulose beads were produced by coagulating cellulose and collecting the coagulated cellulose on the filtering member 17 in the same manner as in Example 1 except that a viscose having a cellulose concentration of 8.0 wt % and an alkali concentration of 5.3 wt % was supplied onto the rotary disk at the rate of 4.5 milliliters per minute with a tube pump with the disk rotated at 1000 rpm.

The cellulose beads thus obtained had an average diameter of 719 μm and a bead size distribution n of 3.75 (rounded to three decimal places), where n is a value in the Rosin-Rammler distribution functional equation. Controls 1 and 2 were thus wide in bead size distribution compared with Examples 1–4.

According to the method of the present invention, it is possible to fly uniform spherical droplets under centrifugal force. Pores in the form of air bubbles are less likely to be formed, so that it is possible to produce cellulose beads and porous cellulose beads that are high in sphericity and narrow in bead size distribution.

What is claimed is:

1. A method of manufacturing cellulose beads comprising supplying a cellulose solution into a vessel rotating at high speed, flying droplets of said cellulose solution through outlets formed in said vessel under a centrifugal acceleration of 10 to 1000 G to form droplets, wherein said outlets have a diameter of 0.1 to 5.0 mm and extend substantially radially of the rotating vessel, and capturing said droplets with a coagulating solution to coagulate the droplets.

2. A method as claimed in claim 9 wherein said cellulose solution has a cellulose concentration of 2=30 wt %.

3. A method as claimed in claim 9 wherein said cellulose solution is an alkaline cellulose solution in which is dissolved a polysaccharide, and wherein said coagulating solution is an acidic solution.

4. Cellulose beads produced by the method of claim 1 and having a bead size distribution of 4 or over as expressed by the exponent in the Rosin-Rammler distribution functional equation.

5. A method as claimed in claim 2 wherein said cellulose solution is an alkaline cellulose solution in which is dissolved a polysaccharide, and wherein said coagulating solution is an acidic solution.

6. Cellulose beads produced by the method of claim 2 and having a bead size distribution of 4 or over as expressed by the exponent in the Rosin-Rammler distribution functional equation.

7. Cellulose beads produced by the method of claim 3 and having a bead size distribution of 4 or over as expressed by the exponent in the Rosin-Rammler distribution functional equation.

8. Cellulose beads produced by the method of claim 5 and having a bead size distribution of 4 or over as expressed by the exponent in the Rosin-Rammler distribution functional equation.

9. A method of manufacturing cellulose beads comprising supplying a cellulose solution into a vessel having a peripheral wall formed with outlets having a diameter of 0.1 to 5.0 mm, rotating said vessel to subject said cellulose solution to a centrifugal acceleration of 10 to 1000 G to form droplets and cause said droplets to fly out of said vessel through said outlets, while flowing a coagulating solution down an inner wall surface of a tubular member surrounding said vessel to capture said droplets with said coagulating solution to coagulate said droplets.

10. A device for manufacturing cellulose beads comprising a vessel rotatable about a vertical axis and having an outer periphery formed with a plurality of outlets having a diameter of 0.1 to 5.0 mm, a drive member for rotating said vessel, a tubular member surrounding said vessel and having an inner peripheral surface, an annular tank provided around said tubular member for storing a coagulating solution in said tank and flowing it down the inner peripheral surface of said tubular member over the entire circumference thereof.

11. A device as claimed in claim 10 wherein said tank has an open top and an inner wall integral with said tubular member, a closed bottom wall, and an outer wall, said inner wall having a top edge disposed below the top edge of said outer wall.

12. A device as claimed in claim 10 wherein said tank has a closed top and an inner wall separate from said tubular member, a bottom wall, and an outer wall, an annular slit being formed in said bottom wall.

* * * * *